(12) United States Patent
Snow

(10) Patent No.: US 11,246,300 B2
(45) Date of Patent: Feb. 15, 2022

(54) FISHING LURE

(71) Applicant: Rick Jay Snow, Greenville, MI (US)

(72) Inventor: Rick Jay Snow, Greenville, MI (US)

( * ) Notice: Subject to any disclaimer, the term of this patent is extended or adjusted under 35 U.S.C. 154(b) by 431 days.

(21) Appl. No.: 15/439,504

(22) Filed: Feb. 22, 2017

(65) Prior Publication Data

US 2017/0325436 A1    Nov. 16, 2017

Related U.S. Application Data

(60) Provisional application No. 62/391,849, filed on May 12, 2016.

(51) Int. Cl.
*A01K 85/16* (2006.01)

(52) U.S. Cl.
CPC .................. *A01K 85/16* (2013.01)

(58) Field of Classification Search
CPC ........................................ A01K 85/16
See application file for complete search history.

(56) References Cited

U.S. PATENT DOCUMENTS

| | | | |
|---|---|---|---|
| 1,333,154 A | 3/1920 | Buddle | |
| 2,100,289 A * | 11/1937 | Khoenle | A01K 85/16 43/42.48 |
| 2,159,591 A * | 5/1939 | Victor | A01K 85/16 43/42.23 |
| 2,187,609 A * | 1/1940 | Larson | A01K 85/16 43/42.35 |
| 2,241,767 A * | 5/1941 | Cullerton | A01K 85/16 43/42.13 |
| 2,245,061 A * | 6/1941 | Wisniewski | A01K 85/16 43/42.47 |
| 2,575,044 A * | 11/1951 | Caldwell | A01K 85/16 43/42.44 |
| 2,579,991 A * | 12/1951 | Wood | A01K 85/16 43/42.22 |
| 2,659,176 A * | 11/1953 | Wenger | A01K 85/16 43/42.31 |
| 2,703,946 A * | 3/1955 | Davis | A01K 85/16 43/42.22 |
| 2,739,407 A * | 3/1956 | Godsey | A01K 85/18 43/42.15 |
| 2,755,592 A | 7/1956 | Bocchhino | |
| 2,906,051 A * | 9/1959 | Joseph | A01K 85/02 43/35 |
| 2,944,363 A | 7/1960 | Poe | |
| 3,203,132 A * | 8/1965 | Kotis | A01K 85/16 43/42.24 |
| 3,367,057 A * | 2/1968 | Pond | A01K 85/18 43/42.02 |

(Continued)

OTHER PUBLICATIONS

Mathematicsdictionary.com/math-vocabulary.htm (last visited Mar. 12, 2021).*

*Primary Examiner* — Christopher R Harmon
(74) *Attorney, Agent, or Firm* — Brooks Kushman P.C.

(57) ABSTRACT

A fishing lure for simulating the motion of dying bait is described. In one embodiment, the fishing lure includes a lure body having a longitudinal line and a nose at a first distal end having a line tie with an anchor secured to the nose of the lure body. The line tie further includes a leg which extends forward and downward from the anchor and at the end of the leg opposite from the anchor an eyelet is provided for connection to a fishing line.

16 Claims, 2 Drawing Sheets

(56) References Cited

U.S. PATENT DOCUMENTS

| | | | | |
|---|---|---|---|---|
| 3,412,500 | A | * | 11/1968 | Lahitnen .............. A01K 85/16 43/41 |
| 3,483,651 | A | * | 12/1969 | Borger ................. A01K 85/16 43/42.36 |
| 4,155,191 | A | | 5/1979 | Spivey |
| 4,667,434 | A | * | 5/1987 | Newell ................ A01K 85/16 43/42.45 |
| 4,671,006 | A | * | 6/1987 | Schuyler, Jr. .......... A01K 85/16 43/42.47 |
| 4,697,378 | A | * | 10/1987 | Tunstall ............... A01K 85/16 43/42.06 |
| 5,425,193 | A | | 6/1995 | Gleb |
| 6,609,326 | B2 | * | 8/2003 | Salonen ............... A01K 85/16 43/42.22 |
| 6,912,808 | B1 | * | 7/2005 | Mak .................... A01K 85/16 43/42.15 |
| 6,931,784 | B1 | | 8/2005 | Sutherland |
| 9,265,239 | B2 | * | 2/2016 | Ford ................... A01K 85/16 |
| 2002/0124455 | A1 | * | 9/2002 | Bauman ............... A01K 85/16 43/42.44 |
| 2010/0011653 | A1 | | 1/2010 | Barczak et al. |
| 2010/0126058 | A1 | * | 5/2010 | Hughes ................ A01K 85/12 43/42.39 |
| 2012/0304524 | A1 | | 12/2012 | Ulianov |
| 2013/0305587 | A1 | | 11/2013 | Takahashi |
| 2016/0157471 | A1 | * | 6/2016 | Leppala ............... A01K 85/16 43/42.22 |
| 2016/0183504 | A1 | | 6/2016 | Curtis |

\* cited by examiner

FISHING LURE

CROSS-REFERENCE TO RELATED APPLICATIONS

This application claims the benefit of U.S. provisional application Ser. No. 62/391,849 filed May 12, 2016, the disclosure of which is hereby incorporated in its entirety by reference herein.

TECHNICAL FIELD

The present invention relates to fishing lures, and more specifically to a type of lure capable of efficiently creating erratic and rolling motions representing those of a dying bait or minnow.

BACKGROUND

Many fishing lures have been designed to simulate the swimming motion of bait, such as minnows, crayfish, frogs and insects, to aid fishermen in catching fish. A feature common to many lures is a line tie incorporated on the front of the lure. Typically, the line tie includes a first eyelet to directly attach fishing line or through which a split ring may be attached and fishing line would in turn be attached to the split ring. Tuning a lure is also a common practice among more experienced fishermen, with the goal being to straighten and align the line tie with the body of the lure to yield a desired swimming motion as the lure is pulled through the water. An indication that a lure is in need of tuning would be a lure that pulls to one side or the other, does not dive as desired or otherwise does not present the desired natural swimming motion of a minnow.

It has been observed that some fish are more responsive, or may be induced to strike when otherwise not inclined, by the erratic actions of a dying minnow. As such, it would be desirable to create a fishing lure that generated a more erratic and realistic rolling motion of a dying minnow rather than the motion of healthy, swimming minnow as the lure is pulled through the water in the course of retrieval, trolling, or jigging.

SUMMARY

In a first disclosed embodiment, a fishing lure to simulate the action of a dying minnow includes a lure body having a longitudinal line and a nose at a first distal end having a line tie with an anchor secured to the nose of the lure body. The line tie further includes a leg which extends forward and downward from the anchor and at the end of the leg opposite from the anchor a first eyelet is provided for connection with a fishing line.

In another disclosed embodiment, a fishing lure to simulate the action of a dying minnow includes a lure body having a longitudinal line and a lateral line extending from a first distal end to a second distal end and a nose at the first distal end. This lure also includes a line tie having an anchor secured to the first distal end of the lure body. The line tie includes a leg that extends forward and downward from the anchor, forming a first angle relative to the lateral line at the first distal end of the lure body. The line tie further includes a first eyelet extending from the leg on the end opposite from the anchor, where the first eyelet is adapted for connection to a fishing line. The fishing lure also includes a bill attached to the lure body with the bill protruding downwardly from beneath the nose and the line tie.

In another disclosed embodiment, a fishing lure to simulate the action of a dying minnow includes a lure body having a longitudinal line and a lateral line extending from a first distal end to a second distal end and a nose located at the first distal end. The lure also includes a line tie having an anchor rigidly secured to the nose of the lure body at a point substantially coincident with the intersection of the longitudinal and lateral lines. The line tie also includes a leg extending forward and downward from the anchor and forming a first angle relative to the lateral line. A first eyelet is also included at the end of the leg opposite from the anchor, the first eyelet being adapted for connection to a fishing line. The fishing lure further includes a bill attached to the lure body and protrudes downwardly away from the lure body from beneath the nose. In this particular embodiment, the bill includes a center that is vertically aligned beneath the first eyelet.

The details of one or more embodiments of the subject matter described in this specification are set forth in the accompanying drawings and the description below. Other features, aspects and advantages of the subject matter will become apparent from the description, the drawings and the claims presented below.

DETAILED DESCRIPTION

As required, detailed descriptions of embodiments are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present embodiments.

Figure 1:
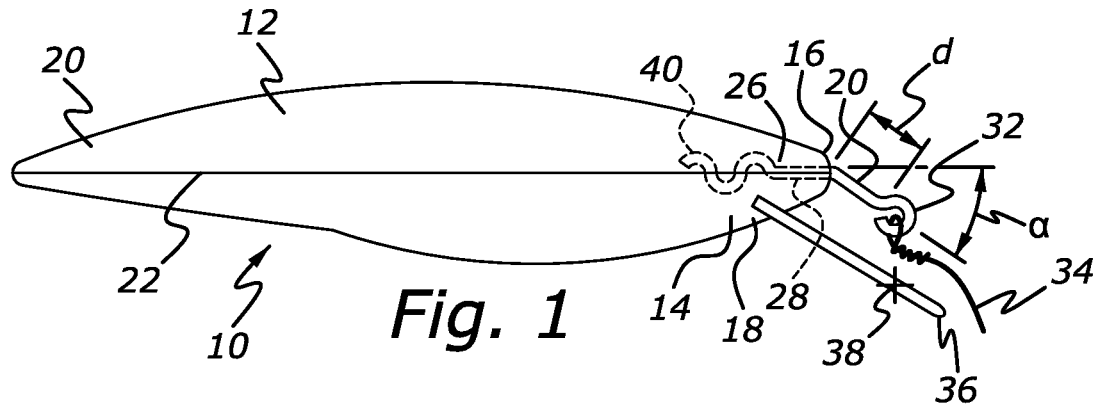
FIG. 1 is a side view of an embodiment of a fishing lure illustrating a lure body, line tie and bill.
Figure 2:
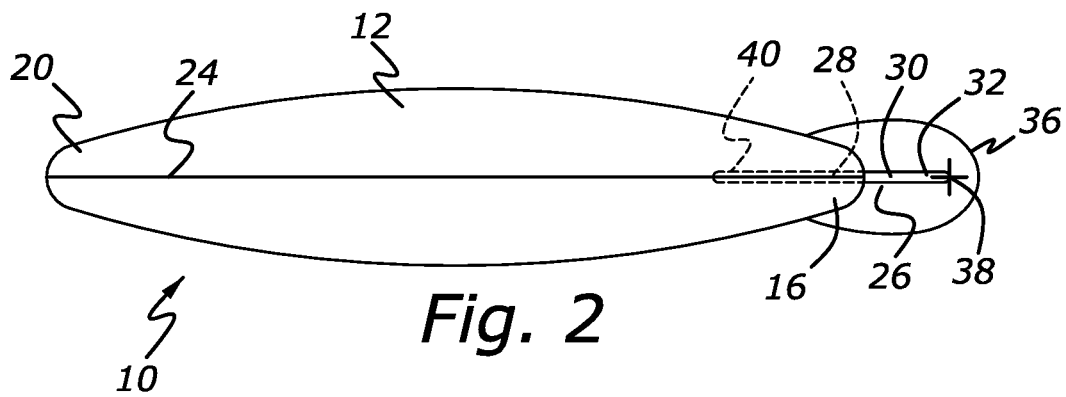
FIG. 2 is a top view of the embodiment shown in FIG. 1.
Figure 3:
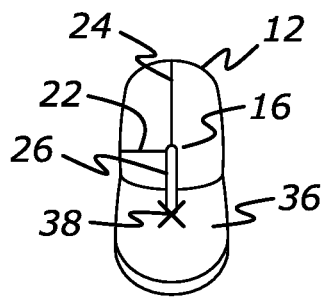
FIG. 3 is a front view of the embodiment shown in FIG. 1.

Referring now to FIGS. 1 through 3, an exemplary fishing lure 10 is generally provided that includes a lure body 12 having a head portion 14 with a nose 16 at a first distal end 18 opposite from a second distal end 20. When viewed from the side as shown in FIG. 1 and from the top as shown in FIG. 2, the lure is generally longitudinal, having a longitudinal axis illustrated by a lateral line 22 and by a longitudinal line 24 running from the first distal end 18 to the second distal end 20. To aid in the description of the embodiment it is preferable to place the lateral line 22 at the first distal end 18 such that it coincides with the nose 16 of the lure body 12. Alternatively, the lateral line 22 may be positioned on the lure body substantially equally between the top and bottom of the lure body 12. This relationship is an estimation of the physical center of the fishing lure, either static or hydrodynamic (meaning the center as the lure is pulled through water.) As most baits are symmetric in their side-to-side configuration, the longitudinal line 24 simply coincides with the longitudinal axis of the lure body 12, spaced substantially equally between the either side of the lure body 12.

The fishing lure 10 further includes a line tie 26 having an anchor 28 securely and preferably rigidly embedded within the lure body at a location coincident with or adjacent to the nose 16 of the lure body 12. Alternatively, in the absence of a distinct nose, the anchor would be attached to the lure body 12 at the first distal end 18 coincident to or adjacent to the intersection of the lateral line 22 and the longitudinal line 24. The line tie 26 also includes a leg 30 which extends forward and downward from the anchor 28 to a first eyelet 32 which is configured for connecting to a fishing line 34. The fishing lure may also include a bill 36.

Figure 4:
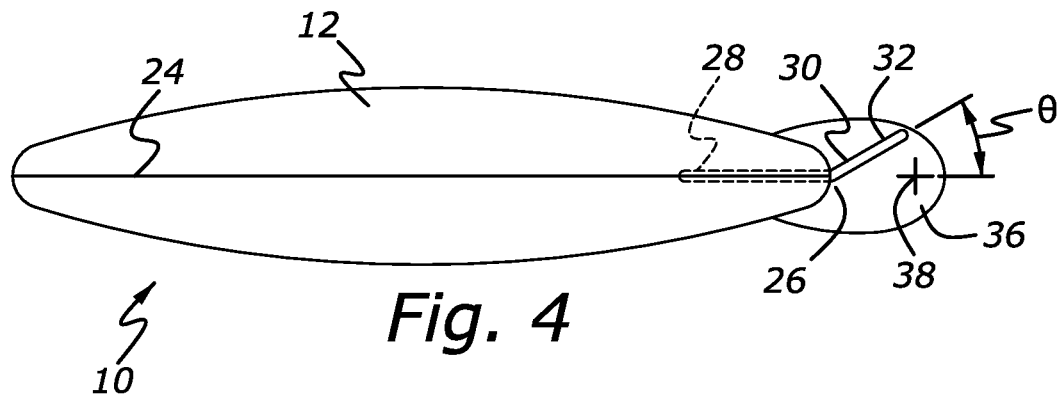
FIG. 4 is a top view of a fishing lure illustrating a variation of the embodiment shown in FIG. 2.
Figure 5:
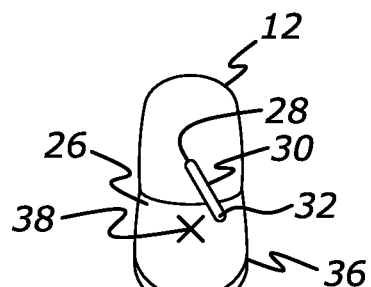
FIG. 5 is a front view of the embodiment shown in FIG. 4.

As can be seen in FIGS. 1 through 3, the leg 30 of the line tie 26 can form a first angle $\alpha$ relative to the lateral line 22. It can further be seen that the length of leg 30 corresponds to the distance (d). The first angle $\alpha$ and distance (d) should be greater than zero to impart the desired dying minnow motion. In the embodiment shown in FIGS. 1-3, it can be seen that the first angle $\alpha$ is set to a value that is similar to the angle formed between the bill 36 and the lateral line 22 and the distance (d) is set such that the first eyelet 32 is aligned vertically above a center point 38 of the bill 36 and below the lateral line 22. Referring now to FIGS. 4 and 5, it can be seen that the leg 30 also forms a second angle $\Theta$ relative to the longitudinal line 24. While it is preferable for the second angle $\Theta$ to be zero, it has been observed in testing that the second angle $\Theta$ can range from 0-30 degrees without diminishing the desired motion of the fishing lure 10.

Figure 6:
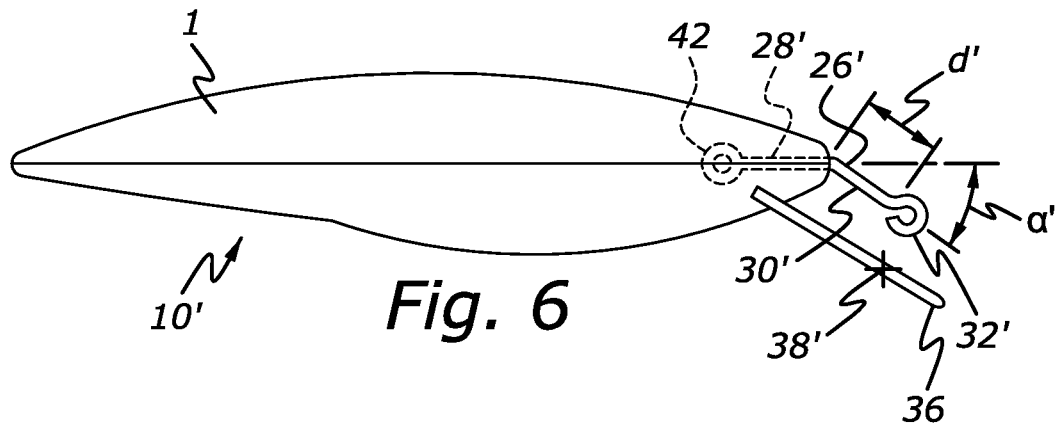
FIG. 6 is a side view of another embodiment of a fishing lure according to the present invention.
Figure 7:
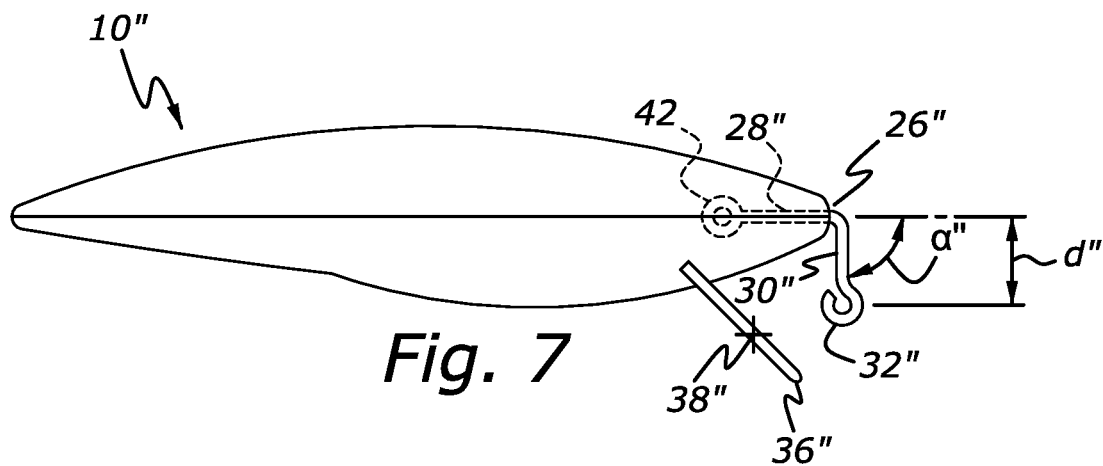
FIG. 7 is a side view of another embodiment of a fishing lure according to the present invention.

Referring now to FIGS. 6 and 7, alternative embodiments illustrating various line tie configurations are shown. In FIG. 6, it can be seen that the length d' of the leg 30' is sufficient to locate the first eyelet 32' forward of the center point 38' of the bill 36'. In FIG. 7, it can be seen that first eyelet 32" is positioned sufficiently forward so as to not be above the bill 36" and the first angle $\alpha$" is approximately 90 degrees. In this embodiment, the leg 30" extends forward a minimal amount roughly equivalent to the thickness of the line tie. These alternatives illustrate some of the possible variations in the relationship of the line tie to the lure body that have proven to impart the desired dying minnow motion. Naturally, many other variations in the length of the leg, angles ($\alpha$ and $\Theta$) are possible, including constructing the fishing lure without a bill.

As illustrated in FIG. 1, the first eyelet 32 of the line tie 26 is oriented such that the opening is visible from the side of the lure, however, the first eyelet 32 may be oriented such that the opening is visible from the top of the lure or any other position. As is known in the art, fishing line 34 may be tied directly to the first eyelet 32 or to a split ring (not shown) if provided or by any connection mechanism (e.g., a knot, snap swivel, crimp attachment, etc.) common to fishermen. The anchor 28 of the line tie 26 may be attached to the lure body 12 using any one of a number of techniques, including being insert molded, threaded and screwed, welded, melt-bonded, or other well-known techniques familiar to those skilled in the art. It is preferred that the anchor 28 is robust in strength to resist torque and tension normally associated with line ties. To this end, the anchor may include a twist 40 to resist rotation of the line tie 26 from the installed position. The twist 40 may be is constructed by forming an in-plane zig-zag in the anchor. Alternative configurations such as a second eyelet 42 could be formed in the anchor, as shown in FIGS. 6 and 7. Yet another simple and effective solution would be a "T" shape formed in the end of the anchor. All of these would be capable of resisting increased torque imparted on the line tie during use.

The line tie 26 can be constructed of any suitable material configured to provide sufficient strength for attachment of a fishing line to the fishing lure 10. For example, the line tie 26 can be constructed from a metal, metal composite, hard plastic, etc. In one particular embodiment, the line tie arm is constructed from preformed stainless steel wire.

The lure body 12 is shown to be generally shaped to resemble a baitfish in the embodiments shown in FIGS. 1-7. However, the lure body 12 can be designed to mimic other aquatic species that are typical food sources for targeted fish, including crawfish, frogs or insects, while still remaining within the scope of the present invention. Desirably, the lure body 12 will be colored to enhance the realistic appearance. For instance, colored plastics or rubber may be used to form the lure body 12. In addition, the lure body 12 can be painted, dipped, stained or wrapped on its external surface to achieve the desired appearance, cost and durability. Further, the lure body 12 can be made of any material suitable for being shaped into a lure body. In one particular embodiment, the lure body 12 is injection molded into a hard plastic body. Alternatively, the lure body 12 can be molded from malleable plastic material (e.g., thermoplastics, thermosetting plastics, etc.) as is commonly known in the art. However, soft plastics can also be utilized to form the lure body 12, particularly when combined with an anchor 28 of the line tie 26 incorporating the torque bearing features similar to those described previously. Together with the material from which the lure body is made, there may be hollow portions within the lure body 12 configured to establish a desired balance and buoyancy of the lure when in the water, both under static and dynamic conditions.

The bill 36 generally extends from the head portion 14 of the lure body 12 and acts as a diving plane for the lure. Thus, the bill 36 can be designed and shaped according to the particular performance and swim depth desired for the particular fishing lure. It should be appreciated that the size, angle and shape of the bill 36 may be configured in various combinations depending on the particular type of the fishing lure. The bill 36 can be constructed of any material that is capable of being molded and/or formed into the desired shape. For instance, in one embodiment, bill 36 can comprise a plastic material integrally molded with the body of the lure. However, it should be readily apparent to those skilled in the art that the bill 36 can be constructed of a metallic material separately fashioned and adapted to be attached to the lure body 12.

The fishing lure 10 will also include hook attachment rings (not shown to simplify the drawings) or the equivalent attached to the lure body 12 in a manner well known in the art. One or more of these would be provided depending on the desired balance and size of the fishing lure. Attached to the hook attachments would be any suitable hook (e.g., a mono hook, double hook, or treble hook), or plurality of them via the hook attachment rings.

Other features can be included on or within the fishing lure 10 as desired. For example, weight (not shown) may be enclosed within the body to help balance the lure in water, control its buoyancy to affect its running and static depth. If the weight is loosely contained within a cavity within the lure body 12, it can further aid in attracting predator fish by generating noise as the lure moves within the water.

The embodiment of FIG. 1 exhibits a motion that realistically simulates the erratic and rolling motion of a real dying minnow as it travels through water. This is largely achieved as result of the novel line tie configuration in relation to other hydrodynamic features of the fishing lure. After casting the fishing lure to the intended target zone, the fishing lure is retrieved in a conventional manner, slowly and preferably in a short start-stop sequence. As the fishing lure is retrieved, it will not only move side-to-side laterally in the water, but importantly, it will partially roll back and forth about the lure's longitudinal axis. This partial rolling motion has been observed to enhance the frequency of predator fish strikes on the fishing lure. The partial rolling motion may be imparted upon the lure in any manner conventional and well known to fisherman, such as lightly jerking the rod tip, jigging or slow trolling. If the fishing lure is completely rolling over as it is retrieved, then the speed, acceleration or jerk of the lure is too great and should be reduced to achieve the desired appearance of a dying minnow. While described here as a dying minnow, the partial rolling action imparted on the lure is effective on other types of a bait, including crayfish, frogs, insects and any other example of swimming bait that fishermen are known to use.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fishing lure to simulate the action of dying bait, comprising:
   a lure body extending from a first distal end to a second distal end, wherein a longitudinal plane and a lateral plane each extend through said first distal end and said second distal end, each of said lateral and longitudinal planes extending through a physical center of said lure body, said lure body having a nose at said first distal end;
   a line tie having an anchor secured to said nose of said lure body at a point coincident with an intersection of said lateral plane and said longitudinal plane;
   a leg extending forward and downward from said anchor;
   a first eyelet extending from said leg opposite from said anchor for connection to a fishing line, wherein said first eyelet is positioned by said leg to be spaced apart from said lateral plane; and
   a bill rigidly secured to said lure body and protruding outwardly therefrom, said bill extending downward from said lateral plane and from beneath said nose, said bill having a center;
   wherein said first eyelet is positioned above said center of said bill such that said first eyelet and said center each reside along a third line, said third line extending perpendicular to and intersecting said lateral plane.

2. The fishing lure of claim 1, wherein said leg forms a first angle with said lateral plane, said first angle being greater than zero.

3. The fishing lure of claim 2, wherein said leg extends away from said nose locating said first eyelet forward of said nose and below said lateral plane.

4. The fishing lure of claim 6claim 1, wherein said bill and said leg both protrude downward from said body at a first angle from said lateral plane.

5. The fishing lure of claim 1, wherein said anchor is rigidly secured to said nose of said lure body.

6. The fishing lure of claim 1, wherein said anchor includes a twist disposed within said lure body.

7. The fishing lure of claim 1, wherein said lure body is shaped as a baitfish.

8. The fishing lure of claim 1, wherein said physical center of said lure body is one of a static physical center, and a hydrodynamic physical center as said lure is pulled through water, such that as said lure is retrieved, said lure body moves side-to-side laterally and partially rolls back and forth about a longitudinal axis defined by the intersection of the lateral and longitudinal planes.

9. The fishing lure of claim 1, wherein said lateral plane is positioned substantially equally between a top and a bottom of said lure body; and
   wherein said longitudinal plane is positioned substantially equally between first and second sides of said lure body.

10. The fishing lure of claim 9 wherein said lateral plane is positioned between said first eyelet and said top of said lure body.

11. A fishing lure to simulate the action of a dying minnow, comprising:
    a lure body having a first distal end and a second distal end, wherein a longitudinal plane and a lateral plane each extend through the first distal end and the second distal end of said lure body and through a physical center of said lure body, said lure body having a nose at said first distal end;
    a line tie having an anchor secured to said first distal end of said lure body at an intersection of said longitudinal plane and said lateral plane;
    a leg extending forward and downward from said anchor, said leg forming a first angle relative to said lateral plane at said first distal end;
    a first eyelet extending from said leg opposite from said anchor, said first eyelet adapted for connection to a fishing line, wherein said first eyelet is rigidly secured to said first distal end of said lure body; and
    a bill attached to said lure body and protruding downwardly from beneath said nose, wherein said bill is rigidly attached to said lure body, wherein said leg and said first eyelet are each positioned between said lateral plane and said bill such that said bill is disposed beneath said leg and first eyelet of said line tie;
    wherein said bill further comprises a center, said center and said first eyelet each residing along a vertical line, said vertical line extending perpendicular to and intersecting said lateral plane, wherein said first eyelet is positioned between said center and an intersection of said lateral plane and said vertical line.

12. The fishing lure of claim 11 wherein said physical center of said lure body is one of a static physical center and a hydrodynamic physical center as said lure is pulled through water, such that as said lure is retrieved, said lure body moves side-to-side laterally and partially rolls back and forth about a longitudinal axis defined by an intersection of the lateral plane and the longitudinal plane;
    wherein said lateral plane is positioned substantially equally between a top and a bottom of said lure body;
    wherein said longitudinal plane is positioned substantially equally between first and second sides of said lure body; and
    wherein said lateral plane is positioned between said first eyelet and said top of said lure body.

13. A fishing lure to simulate the action of a dying minnow comprising:
- a lure body extending from a first front distal end to a second rear distal end, wherein a longitudinal plane and a lateral plane each extend through the first front distal end and the second rear distal end of said lure body and through a physical center of said lure body, said lure body forming a nose at said first distal end;
- a line tie having an anchor rigidly secured to said nose of said lure body at a point substantially coincident with an intersection of said longitudinal and lateral planes;
- a leg of said line tie extending forward and downward from said anchor forming a first angle with said lateral plane;
- a first eyelet extending from said leg opposite from said anchor, said first eyelet adapted for securement to a fishing line; and
- a bill attached to said lure body and protruding downwardly from beneath said nose, said bill having a center vertically aligned beneath said first eyelet.

14. The fishing lure of claim 13, wherein said bill and said leg both protrude downward from said body at the first angle from said lateral plane.

15. The fishing lure of claim 13, wherein said anchor includes a torque twist disposed within said lure body.

16. The fishing lure of claim 13, wherein said anchor includes a second eyelet disposed within said lure body.

\* \* \* \* \*

UNITED STATES PATENT AND TRADEMARK OFFICE
CERTIFICATE OF CORRECTION

PATENT NO. : 11,246,300 B2
APPLICATION NO. : 15/439504
DATED : February 15, 2022
INVENTOR(S) : Rick Jay Snow It is certified that error appears in the above-identified patent and that said Letters Patent is hereby corrected as shown below:

In the Claims

Column 5, Line 63, Claim 4:
After "the fishing lure of"
Delete "claim 6claim 1,"
Insert --claim 1,--.

Signed and Sealed this
Twenty-first Day of February, 2023

*Katherine Kelly Vidal*

Katherine Kelly Vidal
*Director of the United States Patent and Trademark Office*